United States Patent [19]

Ohtsuka

[11] Patent Number: 4,802,035
[45] Date of Patent: Jan. 31, 1989

[54] VIDEO CASSETTE AUTO CHANGER

[75] Inventor: Takashi Ohtsuka, Kanagawa, Japan

[73] Assignee: Sony Corporation, Tokyo, Japan

[21] Appl. No.: 38,311

[22] Filed: Apr. 14, 1987

[30] Foreign Application Priority Data

Apr. 14, 1986 [JP] Japan .................................. 61-84189

[51] Int. Cl.⁴ ........................................... G11B 15/68
[52] U.S. Cl. ......................................... 360/92; 360/71
[58] Field of Search ............... 360/92, 98, 71; 369/34, 369/191, 192; 414/280, 281

[56] References Cited

U.S. PATENT DOCUMENTS

| 4,271,440 | 6/1981 | Jenkins et al. | 360/92 |
| 4,348,152 | 9/1982 | Takamatsu | 360/92 |
| 4,614,474 | 9/1986 | Sudo | 360/98 |
| 4,644,425 | 2/1987 | Tamaki | 360/69 |

FOREIGN PATENT DOCUMENTS

60-209962 10/1985 Japan ................................... 360/92

Primary Examiner—Robert S. Tupper
Attorney, Agent, or Firm—Lewis H. Eslinger; Jay H. Maioli

[57] ABSTRACT

An automatic cassette loading and transferring apparatus for use with at least one reproducing unit which is arranged between two housing blocks adjacent the reproducing unit, in which the housing blocks each hold a plurality of cassettes. The cassette transfer device has inlets facing the two cassette housing blocks for transferring the cassettes back and forth between the blocks, as well as to the reproducing unit. The cassette transferring device has at least one cassette receiving portion formed therein with two inlets and includes transport means capable of carrying in and carrying out a cassette from both of the cassette receiving portions in either direction and includes a cassette push-out element used to push out a cassette housed in each of the receiving portions in either the forward or rear facing directions relative to the two cassette housing blocks. A bar code detector is provided on a movable mounting for scanning an identification code on a cassette and is also movable to either inlet entrance of the cassette receiving portion to accommodate cassettes entering from either side.

12 Claims, 9 Drawing Sheets

VIDEO CASSETTE AUTO CHANGER

BACKGROUND OF THE INVENTION

1. Field of the Invention

This invention relates generally to video tape playback systems in which a number of tapes are transported from a magazine to various video tape playback machines and, more particularly, to apparatus adapted to select a desired tape cassette from a large number of such cassettes housed in a housing block, to provide such selected cassette to a video tape recorder, and to return a cassette back to the housing block.

2. Description of the Background

There are now known automatic cassette loading systems for providing a selection from a large number of tape cassettes to a video tape recorder (VTR) based upon a predetermined program. That is, a computer-type controller is provided with a sequence of desired tapes and then this controller operates to control the automatic cassette loading apparatus to provide sequential video reproduction of the information on the various cassette tapes. This system is typically employed in television broadcast stations to playback commercials and the like in a desired sequence. Although these systems are generally provided to playback the material on the various cassettes such systems may also be employed to record information, that is, the video tape recorder is operated in the recording mode.

Typically the automatic tape transferring systems have large magazines or housing blocks that contain a large number of video cassettes and employ a delivery mechanism that is movable relative to the housing blocks and which can select a video cassette and transport it to the video tape recorder for playback. The typical automatic system such as described above includes a number of video tape recorders in order to permit the sequential operation of the program material with no interruptions between the program segments.

In the typical broadcast station, the programs to be broadcast for each day are sequentially broadcast using a system as described, however, generally during the broadcast of the programs it is desired to insert the prerecorded commercial messages. Because there are a large number of different commercials each day, it is necessary to provide as many as several thousand individual cassettes, thus, the requirement for high-speed action of the cassette transfer system is important.

One system known heretofore has a cassette transferring device that deals with separate arrays or magazines of cassettes, which are arranged in side-by-side relationship with the tape transferring device operating between the two arrays of cassettes. Generally, the tape transfer device has two mechanisms each of which operates in the opposite direction but can only operate in its dedicated direction. Thus, in the typical operation, a desired tape is moved into the transferring device using the appropriate direction drive element, is transported to the video tape recorder for playback, and then using the other of the two directional drive elements is picked up from the video tape recorder after playback, thereby permitting it to be reinserted back into its home slot. This presents a problem, however, when it is desired to rearrange these cassettes in the housing such that it is necessary to remove a tape from the housing using the transferring device that operates in one direction, place it in the other, opposite housing, and then utilize the other element in the transferring device to select it and reposition it back into the original housing at another location. This, of course, becomes very time consuming when there are a large number of tape cassettes to be rearranged. Not only does the procedure become time consuming, but the system needed to control the tape transfer device becomes quite complex.

Therefore, in utilizing the known equipment when decisions are being made concerning the reproducing order of the cassettes and their housed positions, the controller program must be arranged with a close watch on the frequency of use of the cassettes as well as their reproducing times. In addition, the path for transferring the cassette within each block must be controlled to cut down on transfer time.

OBJECTS AND SUMMARY OF THE INVENTION

Accordingly, it is an object of the present invention to provide a cassette transferring system that can eliminate the above-noted defects inherent in the prior art.

Another object of this invention is to provide a tape transfer system in which the tape cassettes arranged in one housing can be rearranged without utilizing an intermediate step of transferring the cassettes to an alternate opposing housing.

A further object of the present invention is to provide a cassette transferring device in which delivery of the cassette in either direction relative to two opposing banks of stored cassettes is possible and whereby the degree of freedom of the cassette transfer operation is improved and quicker selection of a cassette is made possible.

In accordance with an aspect of the present invention, a cassette transferring system is provided having first and second cassette receiving portions for transfer of the cassette to and from a respective cassette housing block, each of the cassette receiving portions being provided with a bi-directional cassette transport belt for pulling in a cassette from either the front or rear of the cassette receiving portion and a push-out mechanism at both the front and rear of the cassette receiving portion for pushing out a cassette to the bin or slot for housing the cassette therein or into the delivery mechanism for a video tape recorder. In addition, a kick lever mechanism is provided for pulling out the cassette from either of the first and second housing blocks for insertion into the cassette receiving portion.

The transport belts in the cassette transferring device are driven such that the cassette can be transferred in both forward and rearward directions in the cassette receiving portions, which in one embodiment is formed having two tiers.

In addition, the push-out mechanisms are also enabled to push-out a cassette to a storage bin or to a tape delivery mechanism located either forward or rearward of the cassette receiving portion. Therefore, the cassette transferring device according to the present invention is capable of carrying-in and carrying-out a cassette from both the front and rear of the transfer device and, thus, transfer of the cassettes to and from first and second housing blocks as well as the reproducing unit is greatly facilitated.

The above and other objects, features, and advantages of the present invention will become apparent from the following detailed description of illustrative embodiments thereof to be read in conjunction with the accompanying drawings, in which like numerals represent the same or similar elements.

DETAILED DESCRIPTION OF PREFERRED EMBODIMENTS

Figure 1:
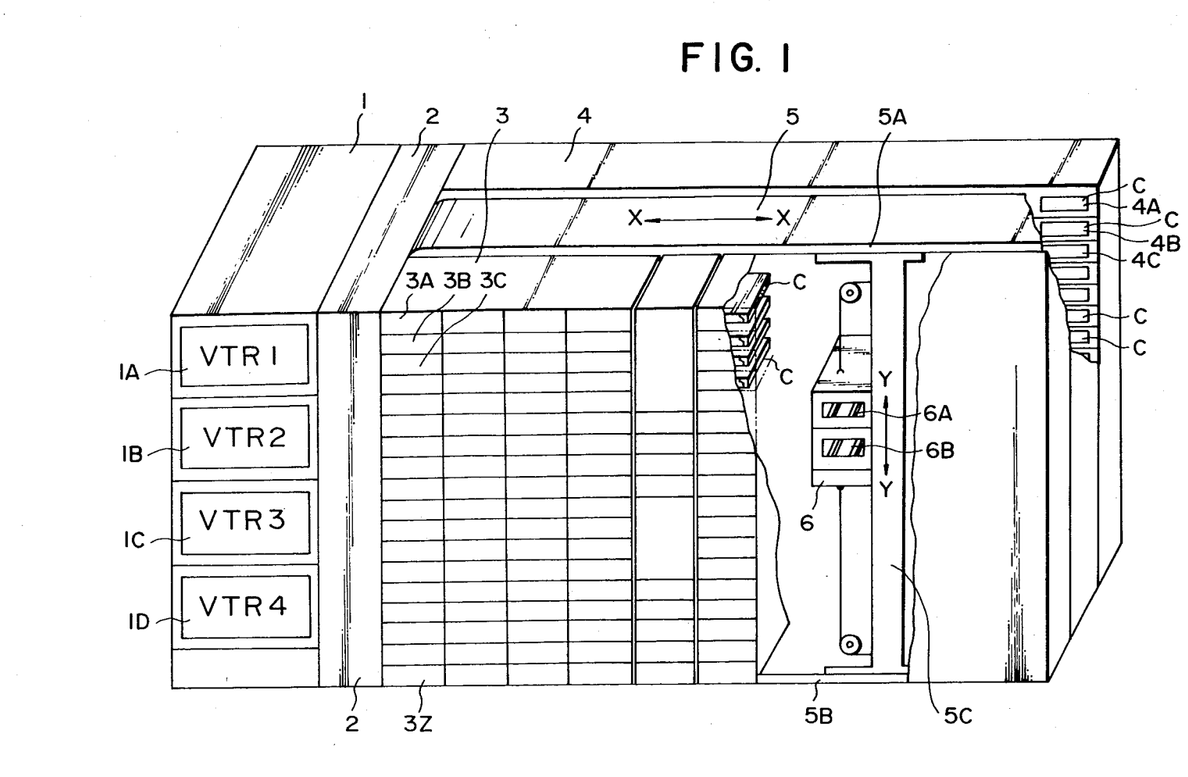
FIG. 1 is a perspective view of an automatic cassette loading apparatus having a cassette transferring mechanism according to the present invention.

A complete automatic cassette loading or transferring apparatus that can supply a large number of tape cassettes to a video tape recorder system according to a predetermined program is represented generally in FIG. 1. The operation of this unit is such that video reproduction or playback is possible for an extended period of time based upon sequential playback of the various cassettes stored in the system. A similar kind of automatic loading apparatus has been proposed in Japanese Patent Application No. 60-287271/85.

In FIG. 1 a video tape recording and reproducing block 1 includes four video tape recorders, 1A, 1B, 1C, and 1D. A cassette delivery mechanism 2 is provided to deliver the cassettes to and from the video tape recorders 1. Two separate cassette housing blocks 3 and 4 are provided with a plurality of slots or bins. Thus, housing block 3 contains bins 3A, 3B, 3C, ... 3n and housing bin 4 contains bins 4A, 4B, 4C, ... 4n for retaining a respective plurality of cassettes C. Located in a space between the two respective housing blocks 3 and 4 is a cassette transferring drive apparatus 5 that includes upper and lower guide rails 5A and 5B, respectively, for transporting a cassette transferring device 6, having cassette receiving portions 6A and 6B, longitudinally in an X-axis direction, as well as vertically in a Y-axis direction along vertical guide rail 5C. More particularly, a drive mechanism (not shown) is provided to move the vertical guide rail 5C horizontally to a desired position along the X axis by means of a timing belt (not shown) and also for moving the cassette transferring device 6 that is suspended from the vertical guide rail vertically in a direction along the Y axis. These drive systems for moving the cassette transferring device 6 are known and because they form no portion of the present invention they need not be shown in detail. The housing blocks in this system typically include cassette input/output portions on the front face of the respective housing blocks 3 and 4 to permit insertion and removal of cassettes from the system, with such input/output portions typically being in the form of hinged doors or the like.

In an automatic cassette loading and transferring system as represented in FIG. 1, the numbers or titles of the individual cassettes housed in the first and second cassette housing blocks 3, 4 and their addresses or positions in the respective blocks are registered in a computer or similar memory unit and the system is set up so that by inputting orders of reproduction of the cassettes to the computer the cassette transferring device 6, which includes the carriage and drive mechanism, can take out the cassettes from the bins 3, 4 that are located at the predetermined addresses and then transfer the same to predetermined VTRs, 1A through 1D, and during the same operation return a cassette that has already been reproduced back to it original bin.

Television broadcast stations typically employ a system such as represented in FIG. 1 to playback prerecorded programs, as well as to insert the commercial messages into the programming and, thus, it is seen that to optimize this system, which employs two sets or banks of cassette housing blocks 3, 4, with the cassette transferring device 6 disposed therebetween and facing each block, the number of housed cassettes should be increased while at the same time effectively reducing the transfer distance.

Figure 2A:
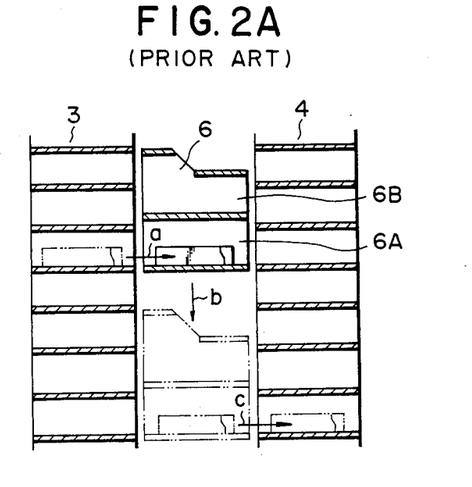
FIGS. 2A and 2B are diagrammatic representations of a cassette loading apparatus known prior to the present invention.
Figure 2B:
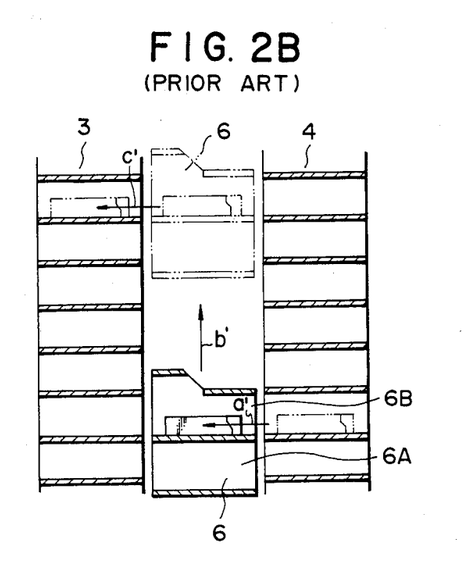

In the cassette transferring device 6 two separate cassette receiving portions 6A and 6B are provided, and turning to FIGS. 2A and 2B a side elevational view is presented, in which the operation of a cassette transferring device 6 known prior to the present invention is depicted. More particularly, in FIG. 2A housing blocks 3 and 4 are shown consisting of the plurality of bins within which cassettes may reside and the cassette transferring device 6 has the two cassette receiving portions 6A and 6B. In the operation of this known system, a cassette is moved from housing 3 into receiving portion 6A in the direction as shown by arrow a then the cassette transferring device 6 moves downwardly, for example, as shown by arrow b. The individual cassette may then be placed in a bin in housing block 4 by transferring the cassette out of the cassette receiving portion 6A in the direction shown by arrow c, which is the same direction as arrow a. Thus, it is seen that the cassette receiving portion 6A of the transferring device 6 is suitable only for transferring a cassette in one direction, for example, from block 3 to block 4. Of course, in actual use a cassette is transferred to the video tape recording system 1 by moving the transporting system along the X axis to the cassette delivering system 2 and thence to the video tape recorders 1. Cassette receiving portion 6B operates to transfer cassettes only in the direction from block 4 to block 3, and this is shown in FIG. 2B. More particularly, a cassette residing in housing block 4 may be transferred into the cassette receiving portion 6B of cassette transferring device 6 in a direction a', the transferring device is moved vertically in a direction of arrow b', and then the cassette is transferred from cassette receiving portion 6B into housing block 3 in the direction of arrow c'. Again, it should be understood that this operation merely represents a transfer of a cassette from one housing block to another in order to accomplish a rearrangement of the cassettes and just as typically the cassette is transported to the cassette delivering mechanism for insertion into the appropriate video tape recorder.

Therefore, it may be seen that when it is desired to change the housing position of a specific cassette that is located, for example, in the first cassette housing block 3 to another position within that very same block, a number of operations must be performed whereby the specific cassette is first carried to the second cassette housing block 4 and then subsequently relocated to the newly specified position in first housing block 3. Thus, in the case where the positions of the cassette are to be changed, for one reason or another, or if some rearrangement is to be made such that the more frequently used cassettes are moved to locations closer to the bank of VTRs 1, the problem is encountered that control of the cassette transferring device 6 becomes complex and, in addition, a long time is required to make the rearrangement because it must be noted, that a large number of cassettes are provided in each of the housing blocks.

Figure 3:
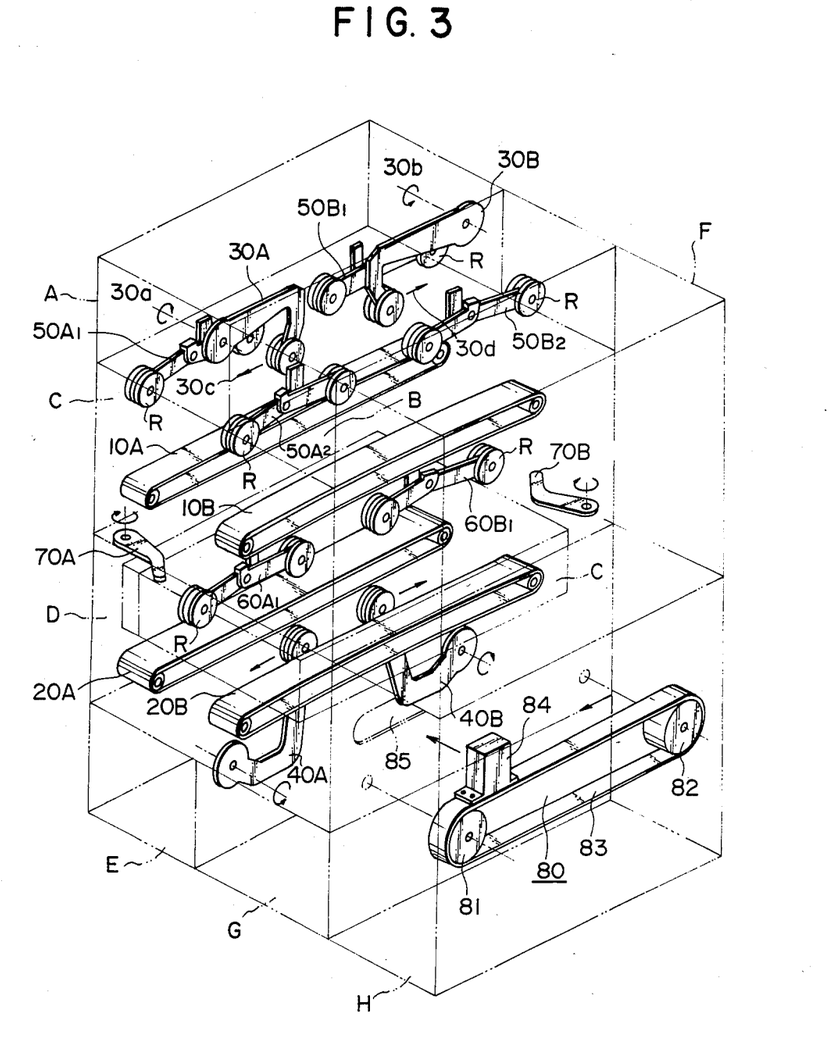
FIG. 3 is a perspective view showing positions of cassette handling mechanisms within a cassette transferring device according to the present invention.

Therefore, the present invention provides a system as shown in FIG. 3 in which a cassette transferring device is provided that is divided generally into eight functional blocks, with such blocks being indicated by two-dot chain lines and denoted as A through H. More particularly, blocks C, D form the cassette receiving portions similar to 6A and 6B as discussed hereinabove. It must be noted that there need not actually be specific blocks formed in the cassette transferring device according to the present invention and that such blocks are provided herein in order to make the explanation of the present invention easier. Block A contains the driving mechanism used to drive two transport belts 10A and 10B that are arranged in Block C, and a similar drive mechanism will be provided in Block G for driving transport belts 20A and 20B that are arranged in Block D. Push-out levers 30A and 30B are provided to push out a cassette (not shown) located in Block C and each push-out lever 30A and 30B is mounted for rotation on a shaft 30a and 30b respectively, to be rotated in the direction as indicated by the arrow by means of a drive mechanism, which will be explained hereinafter and which is located within Block B. Thus, the push-out levers 30A and 30B are arranged to swing in the direction indicated by arrow 30c and 30d, respectively, in order to discharge a cassette housed in Block C in either the forward or rearward direction. This is a distinct departure from systems known heretofore, because movement in only a single direction was possible relative to each individual cassette receiving portion 6A and 6B.

When a cassette c shown by the single-dot chain lines in FIG. 3 housed in Block D is to be pushed-out, such operation is performed by push-out levers 40A or 40B which are arranged in the lower side of the cassette receiving portion D and which are operated by a drive mechanism (not shown) arranged mainly in Block E. The operation of the push-out levers 40A or 40B when causing cassette C to move either in the forward or rearward direction is the same as explained hereinabove relative to push-out levers 30A or 30B in the upper portion of the cassette transferring device.

Also provided according to the present invention and shown in FIG. 3 are cassette presser members attached to the upper portions of Blocks C and D, wherein the individual cassettes are received. More particularly, cassette presser members $50A_1$, $50A_2$ and $50B_1$, $50B_2$ are provided to press on an upper surface of a cassette that is contained within Block C and cassette presser members $60A_1$ and $60B_1$ are provided to press on an upper surface of a cassette contained within Block D. Cassette presser members $60A_2$ and $60B_2$ are not shown in FIG. 3 in order to avoid making the figure confusingly crowded. These cassette presser members are provided to make sure that the respective cassette is in good contact with transport belts 10A and 10B in Block C and 20A and 20B in Block D. Each of these cassette presser members may be formed of four individual mechanisms such as $50A_1$, $50A_2$, and $50B_1$, $50B_2$, relative to the presser members in Block C, and the presser members for Block D are similarly formed of four elements, however, only the elements $60A_1$ and $60B_1$ are shown, with the other two elements being omitted in the interest of clarity.

Although not shown in FIG. 3, each of the cassette presser members is uniformly and constantly urged downwardly by means of springs (not shown) so that as the cassette moves rollers R, which are rotatably mounted at the outer ends of the cassette presser members, can abut the ends of the housed cassette for preventing such cassette from coming out of contact with the appropriate drive structure in the cassette receiving portion. This operation is explained in detail below.

So-called kick levers 70A, 70B, are formed on the cassette transferring device shown in FIG. 3 and are used in the operation of pulling out a cassette from the first cassette housing block 3 and the second cassette housing block 4, respectively. More particularly, kick levers 70A and 70B are shown disposed relative to Block D and, although not shown, two similar levers are also provided relative to Block C. Kick levers 70A and 70B are adapted to be independently operated by a drive mechanism (not shown) that is disposed on the top plate of Block H and located essentially within Block F. Thus, kick lever 70A functions when a cassette is to be taken into Block D from a bin in housing block 3 and operates to actuate a presser piece provided at the inlet of such bin so that the cassette is caused to spring or be popped out of the bin opening. A suitable bin structure is described in detail in Japanese Patent Application No. P 61/10142 filed Jan. 27, 1987 entitled Cassette Retaining Device and assigned to the assignee of the instant invention.

Figure 4A:
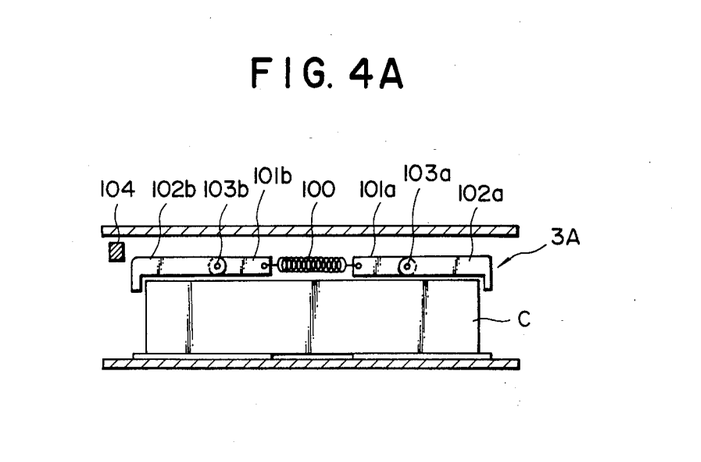
FIGS. 4A and 4B are side elevational views representing the movement of a cassette as it is taken in and out of bin in the system shown in FIG. 1.
Figure 4B:
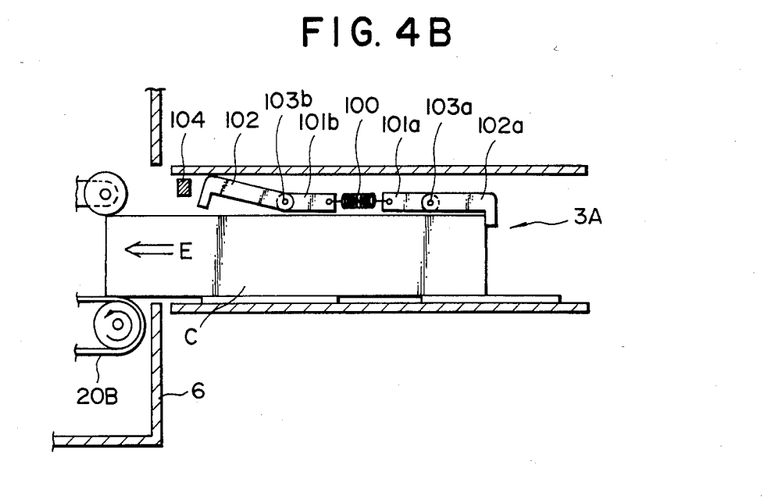

A similar suitable cassette retaining system is represented in FIGS. 4A and 4B in which it is seen that a cassette c is arranged within a bin 3A, for example, by means of front and rear engagement pieces 101a and 101b that tend to be drawn together by means of a spring 100, and which include stoppers 102a and 102b, respectively, that are pivotally attached by shafts 103a and 103b, respectively, to the engagement pieces 101a and 101b. A presser element 104 is provided arranged within bin 3A and is arranged to be impacted or pressed by kick lever 70A, whereby stopper 102b is pushed upwardly by means of a suitable mechanism (not shown), as indicated in FIG. 4B. At the same time, this releases the cassette from the fixed condition due to the releasing of the stopper 102b. As a result, cassette C is pushed outwardly in the direction indicated by arrow E under the force of contraction of spring 100 drawing stopper piece 102a inwardly and, thus, cassette C is driven into the receiving opening of a cassette transferring device 6 located in front of bin 3A.

Therefore, in the operation of the apparatus of FIG. 3 if transport belts 20A and 20b are driven in the appropriate direction and cassette c is taken into a cassette receiving portion formed within Block D in FIG. 3, for example, bar-code reader assembly 80 in Block H will read a bar code arranged on the side face of cassette c, as it is carried into Block D. Bar-code reader assembly 80 may be formed of a bar-code sensor element 84 attached to a movable belt 83 that is disposed between two pulleys 81 and 82. An opening 85 is formed in a side wall of Block D so that the bar-code sensor element 84 can read the bar code on the side of the cassette. The data that is read out in this fashion is then fed to the computer that is used to control the entire system. The reason for the belt arrangement for the bar-code sensor element 84 and the elongated opening 85 will be discussed hereinbelow.

Figure 5:
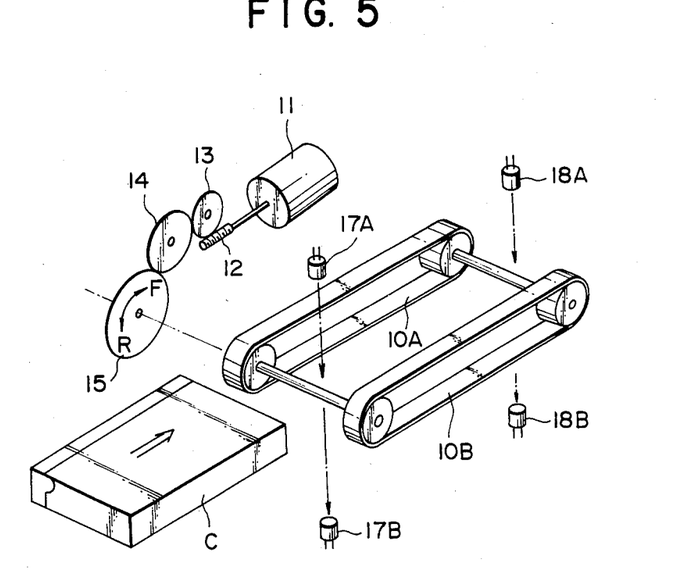
FIG. 5 is an exploded perspective view of a mechanism used for carrying a cassette into the cassette transfer device according to the present invention.

Turning now to FIG. 5, the carrying-in belt mechanism for transporting a cassette c into the receiving opening of the cassette transferring device 6 from one of the bins A, B, C, . . . n of housing block 3 is represented. This structure may be referred to as a cassette delivery mechanism. More specifically, cassette c is shown being inserted in the direction indicated by the arrow and is first subjected to detection by a photoelectric sensor device 17A and 17B, which is arranged in front of transport belts 10A and 10B. A second set of photoelectric sensors 18A and 18B are provided for cassette entry in the opposite direction. It is understood, of course, that a similar arrangement is provided relative to the belts 20A and 20B found in Block D of FIG. 3. In operation, as the output of photosensor portion 17B becomes zero by means of the beam of light emitted from light emitting portion 17A being interrupted by cassette c, a reversible motor 11 rotates in the forward direction such that a drive gear 15 that drives the pulley of the transport belts 10A and 10B is rotated in the appropriate direction. The rotary power is transferred by motor 11 through worm-gear 12, worm-wheel 13, and intermediate gear 14 in order to obtain the appropriate direction of rotation of gear 15, shown as F in this example. The reversible motor 11 and gear train 12, 13, 14, 15 are mounted in Block A as seen in FIG. 3.

Thus, cassette c is taken into the cassette receiving portion C of the cassette transfer device 6 and, once the rear end of the cassette has passed the position defined by the light emitting portion 17A and light receiving portion 17B, motor 11 will be stopped by means of photosensor portion 17B providing an output, or not providing an output, and the carrying-in operation of the cassette will be stopped. Light sensors 18A and 18B operate in a similar fashion such that if the front end of the carried-in cassette breaks the beam of light emitted from light emitting portion 18A, then the output of photosensor portion 18B will go to zero and thereby cause motor 11 to rotate in the reverse direction, such that the cassette is kept in the normal position for being housed.

The photoelectric detector device 17A, 17B and 18A, 18B can be spaced apart so that the devices can be commonly used for the two cassette receiving portions C and D, because only one of the two tiers is in an operating mode at any one time.

Although not shown, further sensors are provided in the receiving portion within the cassette transferring device that sense the presence or absence of a cassette therein and constantly provide information as to in which of the two tier portions of the cassette receiving portions a cassette is inserted.

Figure 6A:
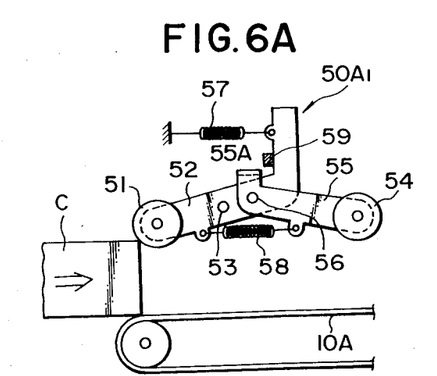
FIGS. 6A–6C are side elevational views showing the operation of a cassette presser member useful in the apparatus of FIG. 1.
Figure 6B:
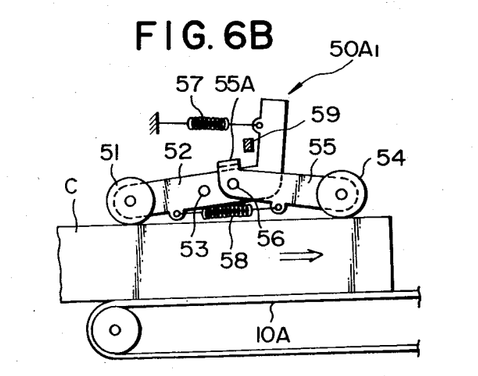
Figure 6C:
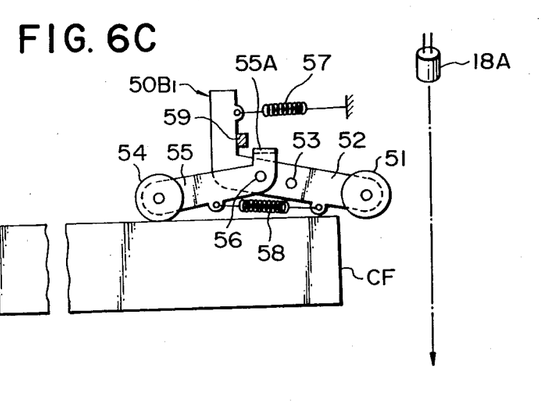

FIGS. 6A–6C are diagrammatic representations useful in explaining the operation of the cassette presser elements that are used to press the cassette against the movable drive belts. As seen in FIG. 3, there are generally four such presser members available for each of the cassette receiving portions, and each cassette presser member is formed of a first arm 52 supporting a roller 51, which was denoted R in FIG. 3. Arm 52 is pivotally supported about a shaft 53 affixed to a plate of the overall frame (not shown) and a second arm 55 supports a roller 54 and is also pivotally supported about a shaft 56 that is mounted on the first arm 52. First arm 52 is urged in a counterclockwise direction about pin 53 by means of spring 57 and a second spring 58 is stretched between first arm 52 and second arm 55. Therefore, as cassette c is inserted onto the carrying-in belt 10A in the direction of the arrow in the procedure described hereinabove relative to FIG. 5, roller 51 is first rotated against the tension of spring 57, as shown in FIG. 6A, and the upper end of first arm 52 moves away from stopper 59 by being forced to rotate in a clockwise direction. Thereby, the protruding end 55A of second arm 55, which is in engagement with first arm 52, is caused to move slightly downward as first arm 52 rotates about pin 53. As cassette c advances into the cassette receiving portion, roller 54 also presses on the top face of cassette c through the action of spring 58, as shown in FIG. 6B. Therefore, as cassette c is carried into the cassette receiving portion it is fully pressed against the transport belt 10A. When the cassette c has been completely carried into the cassette receiving portion and the transport belt is caused to stop, as described above, roller 51 will fall over the rear edge of cassette c, as represented in FIG. 6C. This acts to keep cassette c from coming out of the cassette receiving portion when the cassette transferring device 6 is driven along the X or Y axis, as shown in FIG. 1. Because there are two cassette presser members for the front and back of the cassette c, then the other presser member $50B_1$ will act to prevent the cassette from coming out of the other end of the cassette receiving portion during movement of the cassette transferring device.

Figure 7:
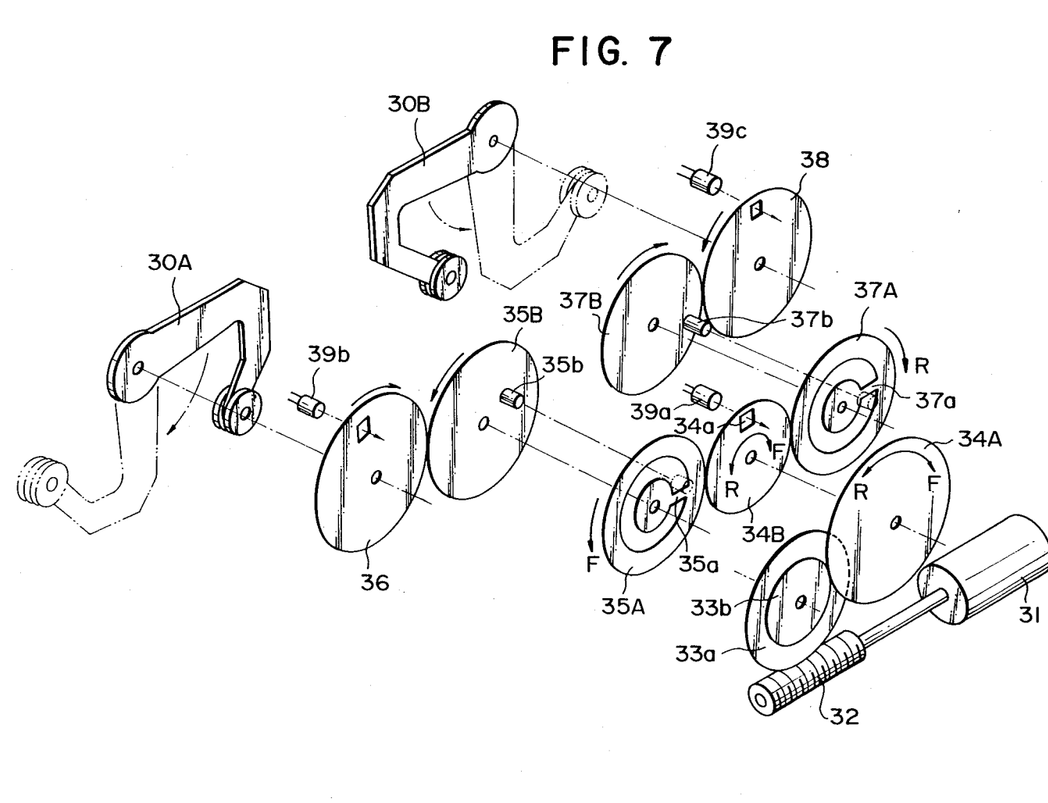
FIG. 7 is an exploded perspective view of a cassette push-out mechanism according to the present invention.

The push-out lever mechanism and the drive therefor are shown in detail in FIG. 7, in which the push-out levers 30A and 30B that are used for discharging the cassette housed in the cassette transferring device into the appropriate bin A, B, C, . . . n of housing blocks 3 or 4 are shown. A reversible motor 31 is provided with a worm-gear 32 that meshes with a worm-wheel $33a$, which has a gear $33b$ firmly affixed thereto, and a first drive gear 34A meshes with gear $33b$. A second drive gear 34B is coaxially and rigidly connected to the first drive gear 34A and is engaged with two reversing gears 35A and 37A. Coaxially arranged with the first reversing gears 35A and 37A are second reversing gears 35B and 37B, respectively, which are coaxially arranged relative to the first reversing gears 35A and 37A, but are loosely fit on the coaxial shafts and are adapted such that pins $35b$ and $37b$ affixed to reversing gears 35B and 37B, respectively, can fit into circumferential slots and abut ribs $35a$ and $37a$ formed in the first reversing gears 35A and 37A, respectively. The second reversing gears 35B and 37B mesh with drive gears 36 and 38, respectively, and the push-out levers 30A and 30B are attached for mutual rotation with drive gears 36 and 38, respectively.

The operation of the push-out lever system and the driving mechanism according to the present invention is such that the cassette can be pushed out of the cassette transferring device into a bin or video tape recorder in either direction. For example, when a cassette arranged in the cassette transferring device is moved to be loaded into a specified video tape recorder the cassette in the cassette receiving portion is first discharged by the above-described transport belt to a predetermined position and when a beam of light from the light emitting portion 17A is received by the photosensor portion 17B motor 31 is energized. As motor 31 rotates in the normal or forward direction, the power is transmitted through the worm-gear 32, worm-wheel 33a and gear 33b, first drive gear 34A and second gear 34B, to gears 34A and 34B that are rotated in the direction indicated by arrow F in FIG. 7. Then, first reversing gear 35A is rotated in the direction indicated by arrow F and second reversing gear 35B is rotated with first reversing gear because pin 35B is abutting rib 35a formed on first reversing gear 35A. As a result, the push-out lever 30A is rotated in a clockwise direction by action of drive gear 36 and the rear-end portion of the cassette is thereby pushed to cause the cassette to exit the cassette receiving portion. Thus, a cassette having a rear-end portion barely remaining in the receiving portion of the cassette transferring device is pushed all of the way into the cassette delivery mechanism or into the bin, so that the cassette is completely discharged from the cassette receiving portion.

Figure 8:
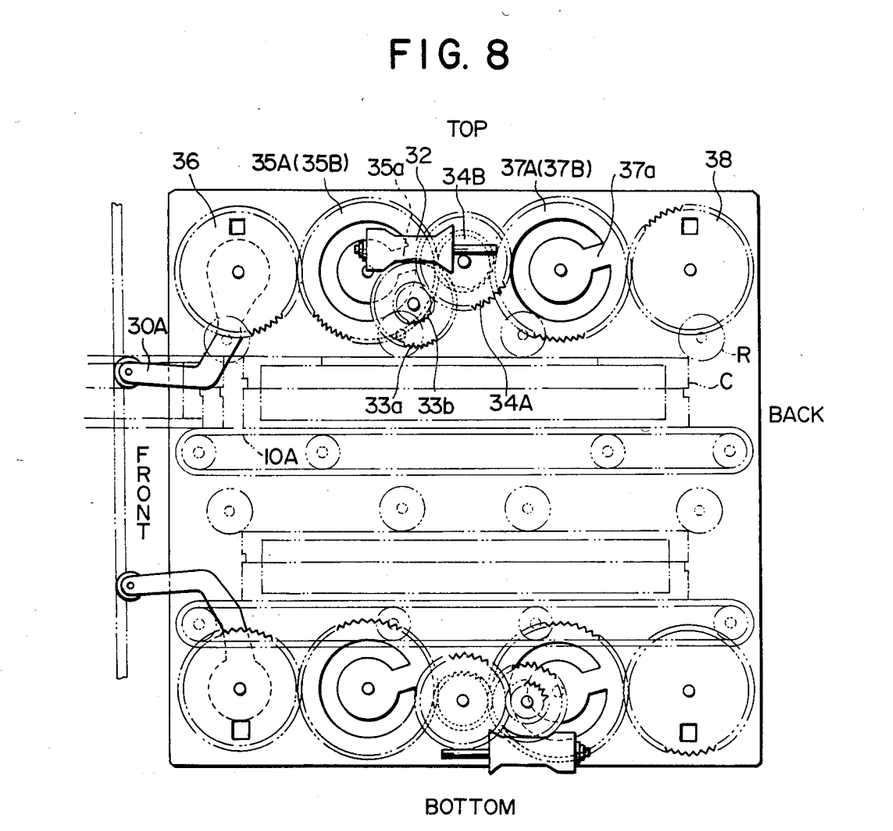
FIG. 8 is a side elevational view of the cassette push-out mechanism of FIG. 7.

The elements according to the present invention are shown in FIG. 7 in an exploded view and reference is made to FIG. 8, which represents an actual assembly of these elements into a prototype structure. Note that push-out lever 30A is shown in two positions, that is, the retracted position when the cassette is residing within the cassette receiving portion and in the extended position, in which it is rotated clockwise to push the cassette the last way out of the cassette receiving portion. Both the upper and lower tiers, corresponding respectively to 6A and 6B in FIG. 1, of the cassette transferring device are shown in FIG. 8.

Turning back to FIG. 7, which although it is the same structure as in FIG. 8 is an exploded view, it is seen that at the time the push-out lever 30A is rotated clockwise, first reversing gear 37A that drives the other push-out lever 30B is also rotated in a counterclockwise direction but because rib 37a rotates in the direction going away from pin 37b, the second reversing gear 37B will undergo no rotation and will remain in its at-rest position. Thus, the other push-out lever 30B undergoes no rotary motion.

The cassette push-out operation is performed by a full rotation of the first drive gear 34A that is firmly affixed to drive gear 35B, hence, a light sensor 39a senses the light at the time of the start of rotation and senses light again at the conclusion of a full rotation of gear 34B. Another light sensor 39b that senses the position of push-out lever 30A will be off due to rotation of the drive gear 36, and motor 31 will be actuated to drive in a reverse direction. Then after a full reverse rotation has been made, sensor 39a will once again sense light and turn on and at the same time sensor 39b will also be turned on. Thus, the home position is detected and motor 31 is stopped.

When a cassette housed in the cassette transferring device is to be discharged to the other side, that is, to housing block 4, for example, push-out lever 30B is used. As in the explanation above, the cassette is first pushed out in the other direction by means of the transport belts and when the light from the light emitting portion 18A is received by the photosensor portion 18B, motor 31 will be driven to rotate in a reverse direction.

In this mode, first reversing gear 37A and second reversing gear 37B will be rotated and thereby push-out lever 30B is rotated into the position indicated by the dotted line in FIG. 7, and after the cassette has been completely discharged from the cassette receiving portion the push-out lever 30B will be returned to its home position, which can be detected by sensors 39a and 39C. Because the rotational operation during the movement of the second push-out lever 30B are the same as the first push-out lever 30A, a further description is not needed.

Figure 9:
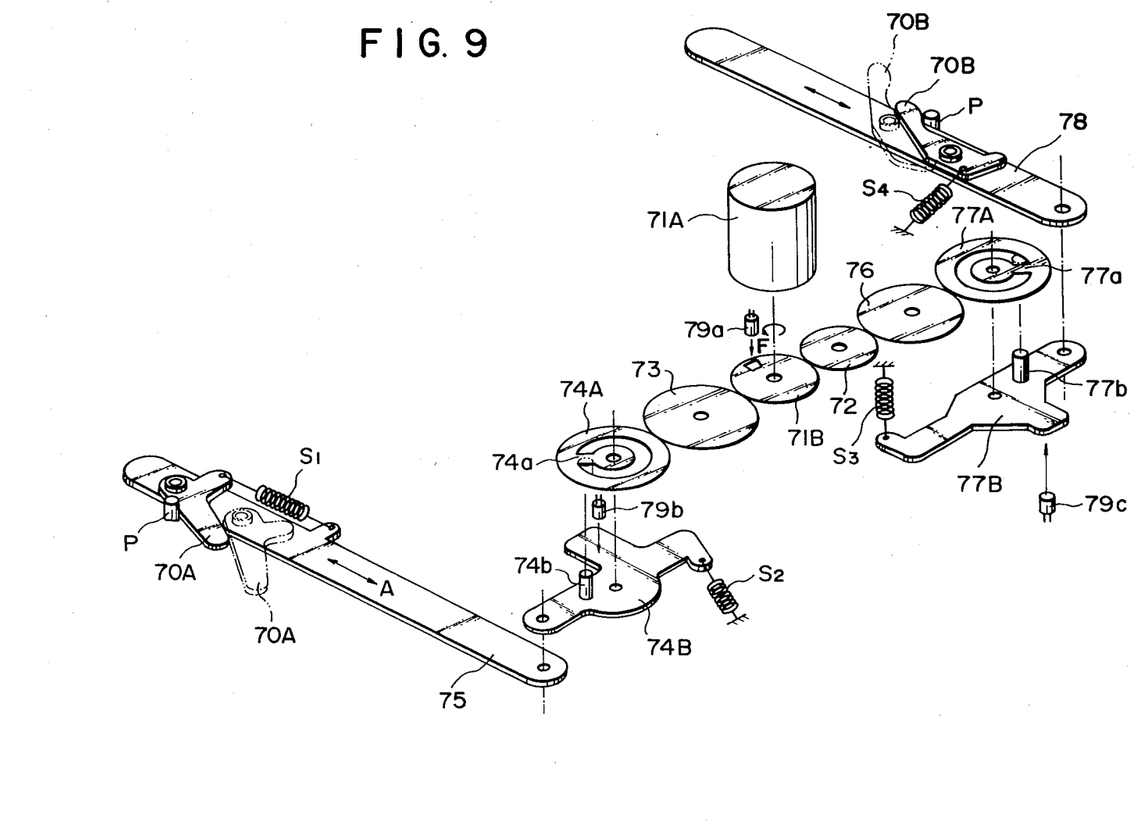
FIG. 9 is an exploded perspective view of the kick lever drive mechanism according to the present invention.

FIG. 9 is an exploded perspective of the kick lever drive mechanism that is used to release cassettes from the bins by means of the kick levers 70A and 70B that are provided on the top face of Block H in FIG. 3. A reversible motor 71A is provided to drive a drive gear 71B that is engaged with a reversing gear 72. The rotation of drive gear 71B is also transmitted through an intermediate gear 73 to a lost-motion gear 74A and to a drive arm 74B provided coaxially therewith. By means of drive arm 74B a slide plate 75 that is pivotally attached to drive arm 74B is moved in a longitudinal direction, as indicated by arrow A. Kick lever 70A is pivotally supported on movable slide plate 75.

Rotation of reversing gear 72 is, adapted through intermediate gear 76, lost-motion gear 77A to move another slide plate 78 in a direction indicated by arrow A. Lost-motion gears 74A and 77A are provided with circumferential slots and ribs 74a and 77a, respectively, and drive arms 74B and 77B are provided with pins 74b and 77b, respectively, which are arranged to protrude into the slots and to abut ribs 74a and 77a. Thus, when motor 71 rotates in a normal direction as represented by arrow F in FIG. 9, lost-motion gear 74A rotates counterclockwise such that rib 74a pushes pin 74b and, thus, drive arm 74B also rotates counter clockwise against the action of a spring S$_2$ and slide plate 75 is moved in the direction indicated by arrow A. Motion of slide plate 75 then causes kick lever 70A that is pivotally supported by slide plate 75 and which has been abutting a stop pin P to be rotated in a clockwise direction by action of spring S$_1$, thereby causing the tip of kick lever to be projected outwardly relative to slide plate 75, as represented in dashed lines at FIG. 9.

At this time, intermediate gear 76 that is engaged with the reversing gear 72 is rotated and the lost-motion gear 77A is also rotated. Nevertheless, because its rotation is in a clockwise direction rib 77a moves in a direction away from pin 77b and drive arm 77b does not rotate. Thus, drive arm 77B undergoes no rotational forces, and the other kick lever 70B remains in a position as indicated by the solid lines in FIG. 9. Nevertheless, if motor 71A is caused to rotate in a reverse direction, the lost-motion gear 77A is rotated counterclockwise and, thus, pin 77a is rotated counterclockwise by means of rib 77a, such that slide 78 is moved by action of drive arm 77B in the direction indicated by arrow A. As a result, kick lever 70B that was at rest in abutment against a stop element P is separated from stop element P and at the same time kick lever 70B is rotated clockwise by action of spring S$_4$ that urges kick lever 70B outwardly in the clockwise direction.

Photoelectric sensors 79a, 79b, 79c sense the rotational positions of the drive gear 71B and the drive arms 74B and 77B, respectively. Thus, when all sensors are off it indicates that all of the above elements are in their home positions. When kick lever 70a is driven, sensors 79b and 79a are turned from off to on and at that point motor 71A is reversed so that the elements are restored to their home positions. If kick lever 70b is driven, sensor 79c and 79a are turned from off to on and at this point motor 71A is rotated in its normal direction so that the elements are restored to their home positions.

Referring back to FIG. 3, attention is directed to the provision of the elongated slot 85 in the side wall housing of the assembly. This slot 85 is provided so that the bar code indicating the number, title and the like of the cassette housed inside can be read by means of the bar-code reader assembly 80. The use of such bar-code readers in a system such as this is known, however, normally the bar-code sensor 84 is firmly affixed to the assembly and reads the code as the cassette is moved through the cassette receiving portion. One reader assembly is provided for each cassette receiving portion. According to the present invention, the position of bar-code sensor 84 is controlled by means of belt 83 and pulleys 81 and 82 to take a home position on the side of the cassette receiving portion at which the cassette is carried in and is adapted to read the bar code recorded on a side face of the cassette that is taken onto the transport belt 20A and 20B as described above. A problem has been found, however, in that when the side face of the cassette is dirty or the carrying-in speed varies, it becomes impossible to read the bar code correctly at the time the cassette is being received into the cassette transferring device. Therefore, according to the present invention if the bar code cannot be read by the sensor when it is in its home position and correct bar code data cannot be fed to the computer, a drive motor (not shown) is driven to move pulleys 81 and 82 back and forth so that the bar code of the cassette housed in the cassette receiving portion can be scanned by bar-code sensor 84 through slot 85. Bar-code sensor 84 can also be laterally transported to an appropriate position which is close to the bin from which the cassette is being transported. Thus, only a single bar-code sensor need be supplied to accommodate the entry and exit of the cassettes into the cassette receiving portion from either side, that is, either from the bins of block 3 or block 4.

The above description is given on a single preferred embodiment of the invention, but it will be apparent that many modifications and variations could be effected by one skilled in the art without departing from the spirit or scope of the novel concepts of the invention, which should be determined by the appended claims.

What is claimed is:

1. In an apparatus for automatically supplying and selectively reproducing a cassette having a plurality of reproducing and/or recording units, first and second housing blocks closely spaced apart from and in facing relation to each other and adjacent to said reproducing and/or recording units, each of said housing blocks including a plurality of bins for storing cassettes, and a cassette transporting device movable between said first and second housing blocks for transporting said cassettes between said cassette bins of said first and second housing blocks and between said cassette bins and said reproducing and/or recording units, said cassette transporting device comprising:

at least one cassette receiving portion having two inlets provided at opposing sides thereof, said opposing sides respectively facing said first and second cassette housing blocks;

means for carrying a cassette into and out of said cassette receiving portion through said inlets; and means for pushing out a cassette housed in said cassette receiving portion through a selected one of said inlets after the cassette is carried from said cassette receiving portion toward said selected inlet by said means for carrying;

whereby a cassette can be transferred via said one cassette receiving portion from any bin of one of said blocks to any bin of the same block or to any bin of the other of said blocks.

2. A cassette transporting device according to claim 1, in which said means for carrying a cassette includes drive belt means for linearly moving said cassette between said inlets and being arranged to contact a flat surface of the cassette.

3. A cassette transporting device according to claim 2, further comprising presser elements arranged in juxtaposition to said drive belt means for contacting an opposite flat surface of the cassette and for resiliently pressing against said opposite flat surface of the cassette, whereby said cassette is maintained in contact with said drive belt means during movement of said cassette by said drive belt means.

4. A cassette transporting device according to claim 3, in which said presser elements include elongate arms having roller elements at ends of said arms and further include spring elements for biasing said arms into contact with said opposite flat surface of the cassette.

5. A cassette transporting device according to claim 1, in which said means for pushing out the cassette include pivotally arranged push-out arms for contacting a rear surface of the cassette relative to said inlet and means for providing a driving force to said push-out arms, whereby the driving force is transferred to the cassette.

6. A cassette transporting device according to claim 5, in which said means for pushing out further comprises sensor elements for sensing a front and rear edge of the cassette relative to said inlet as it is received in and pushed out of said inlets.

7. A cassette transporting device according to claim 1, further comprising a kick element arranged adjacent said inlet and pivotally mounted to be driven outwardly, said kick element in cooperation with said means for carrying facilitating release of a cassette from a cassette bin.

8. In an apparatus for automatically supplying and selectively reproducing a cassette, having a plurality of reproducing and/or recording units, a cassette housing block adjacent to said reproducing and/or recording units and having a plurality of cassette bins for storing said cassettes and a cassette transporting device adjacent to said reproducing and/or recording units and to said cassette housing block for transporting said cassettes between said cassette bins in said housing block and between said cassette bins and said reproducing and/or recording units, each of said cassettes being provided with an identification marking, said cassette transporting device comprising:

a cassette receiving portion having two inlets;

means for carrying a cassette into and out of said cassette receiving portion through either of said inlets in either of two directions which are respectively opposite to each other;

detector means for detecting said identification marking of a cassette in said cassette receiving portion; and means for moving said detector means along one of said directions.

9. A cassette transporting device according to claim 8, in which said identification marking comprises a bar code.

10. A cassette transporting device according to claim 9, in which said means for moving said detector means includes means for scanning said bar code by said detector means, thereby redetecting the identification marking of the cassette.

11. A cassette transporting device according to claim 8, in which said means for moving said detector means includes means for moving said detector means to be located adjacent either inlet of said cassette receiving portion.

12. A cassette transporting device according to claim 8, in which said means for moving said detector means comprises a belt arranged between first and second pulleys, at least one of said pulleys been driven.

* * * * *